United States Patent [19]

Kruckenberg

[11] 4,268,439
[45] May 19, 1981

[54] BASIC AZO DYESTUFFS HAVING BENZYLAMMONIUMAMINE SUBSTITUENT IN THE COUPLING COMPONENT

[75] Inventor: Winfried Kruckenberg, Leverkusen, Fed. Rep. of Germany

[73] Assignee: Bayer Aktiengesellschaft, Leverkusen, Fed. Rep. of Germany

[21] Appl. No.: 775,053

[22] Filed: Mar. 7, 1977

Related U.S. Application Data

[63] Continuation-in-part of Ser. No. 741,692, Nov. 15, 1976, abandoned, which is a continuation of Ser. No. 142,386, May 11, 1971, abandoned.

[30] Foreign Application Priority Data

May 16, 1970 [DE] Fed. Rep. of Germany ........ 2024184
Aug. 21, 1970 [DE] Fed. Rep. of Germany ........ 2041690

[51] Int. Cl.³ .................... C07C 107/06; C09B 44/02; C09B 44/04
[52] U.S. Cl. .................... 260/205; 260/148; 260/149; 260/186; 260/206; 206/207; 206/207.1; 206/207.5; 206/208; 564/282; 564/284; 564/285; 564/289
[58] Field of Search ............ 260/205, 206, 207, 207.1, 260/207.5, 149

[56] References Cited
FOREIGN PATENT DOCUMENTS 1811179 7/1969 Fed. Rep. of Germany ...... 260/207
478196 10/1969 Switzerland ...................... 260/205
1154006 6/1969 United Kingdom ................ 260/205

OTHER PUBLICATIONS

Venkataraman, *The Chemistry of Synthetic Dyes*, Academic Press Inc.: New York, 1952, vol. I, p. 640, vol. II, pp. 1217–1220.
Venkataraman, *The Chemistry of Synthetic Dyes*, Academic Press; New York, 1971, vol. IV, pp. 425–428.

*Primary Examiner*—Charles F. Warren
*Attorney, Agent, or Firm*—Sprung, Felfe, Horn, Lynch & Kramer

[57] ABSTRACT

Basic azo dyestuffs which are free from sulfonic acid and carboxylic acid groups and correspond to the formula

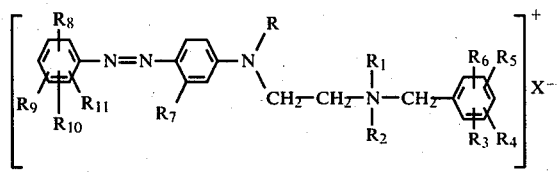

wherein the radical have the below mentioned meaning, water-solubility and drawing speed and are used for dyeing and printing of polymers and copolymers of acrylnitrile, acid-modified polyesters or polyamides, and for dyeing of leather, tanned cotton, polyurethanes, writing liquids, lignin-containing fibres and for coloring of printing pastes.

13 Claims, No Drawings

BASIC AZO DYESTUFFS HAVING BENZYLAMMONIUMAMINE SUBSTITUENT IN THE COUPLING COMPONENT

This is a continuation-in-part of copending application Ser. No. 741,692 filed Nov. 15, 1976, abandoned; which in turn was a continuation of application Ser. No. 142,386, filed May 11, 1971, now abandoned.

The subject-matter of the invention comprises valuable water-soluble azo dyestuffs which are free from acidic water-solubilizing groups, especially from sulphonic acid and carboxylic acid groups, and correspond to the formula

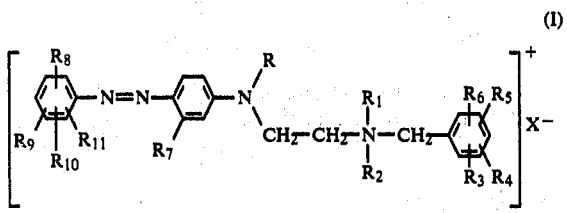

in which

R stands for hydrogen, methyl, ethyl, n-propyl, isopropyl or n-butyl;

$R_1$ is hydrogen, methyl or ethyl;

$R_2$ is methyl or ethyl;

$R_3$ is hydrogen, chlorine, bromine, nitro, methyl, ethyl, n-propyl, iso-propyl, n-butyl, tert.-butyl, methoxy, ethoxy, n-propoxy, iso-propoxy, n-butoxy, benzyl or phenyl;

$R_4$ is hydrogen, chlorine, bromine, nitro, methyl, ethyl, n-propyl, iso-propyl, n-butyl, tert.-butyl, methoxy, ethoxy, n-propoxy, iso-propoxy, n-butoxy, benzyl or phenyl;

$R_5$ is hydrogen, chlorine, bromine, nitro, methyl, ethyl, n-propyl, iso-propyl, n-butyl, tert.-butyl, methoxy, ethoxy, n-propoxy, iso-propoxy, n-butoxy, benzyl or phenyl;

$R_6$ is hydrogen, chlorine, bromine, nitro, methyl, ethyl, n-propyl, iso-propyl, n-butyl, tert.-butyl, methoxy, ethoxy, n-propoxy, iso-propoxy, n-butoxy, benzyl or phenyl;

$R_7$ is hydrogen or methyl;

$R_8$ is hydrogen, chlorine, bromine, cyano, nitro, carbomethoxy, methoxy, methyl or N,N-dimethylsulphamoyl;

$R_9$ is hydrogen, chlorine, bromine, cyano, nitro, carbomethoxy, methoxy, methyl or N,N-dimethylsulphamoyl;

$R_{10}$ is hydrogen, chlorine, bromine, cyano, nitro, carbomethoxy, methoxy, methyl or N,N-dimethylsulphamoyl;

$R_{11}$ is hydrogen, chlorine, bromine, cyano, nitro, carbomethoxy, methoxy, methyl or N,N-dimethylsulphamoyl; and $X^-$ is an anion.

A preferred variant of the dyestuffs according to the invention corresponds to the formula

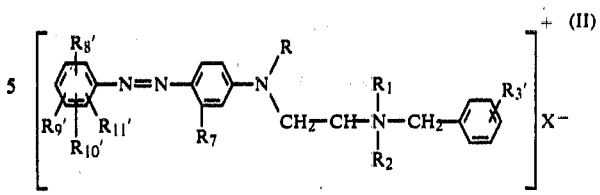

in which

R stands for hydrogen, methyl, ethyl, n-propyl, isopropyl or n-butyl;

$R_1$ is hydrogen, methyl or ethyl;

$R_2$ is methyl or ethyl;

$R'_3$ is hydrogen, chlorine, nitro, methyl, ethyl, n-propyl, tert.-butyl, methoxy, ethoxy;

$R_7$ is hydrogen or methyl;

$R'_8$ is hydrogen, bromine, methyl, chlorine, cyano or nitro;

$R'_9$ is hydrogen, bromine, methyl, chlorine, cyano or nitro;

$R'_{10}$ is hydrogen, bromine, methyl, chlorine, cyano or nitro;

$R'_{11}$ is hydrogen, bromine, methyl, chlorine, cyano or nitro; and $X^-$ is an anion.

In particular, the subject-matter of the invention comprises water-soluble azo dyestufs of formula (II) in which $R'_3$ is hydrogen and $R_1$ is methyl or ethyl.

The anionic radicals $X^-$ may be inorganic as well as organic ions; examples: chloride$^-$, bromide$^-$, iodide$^-$, $CH_3SO_4^-$, $C_2H_5SO_4^-$, p-toluene-sulphonate, $CH_3SO_3^-$, $HSO_4^-$, benzene-sulphonate, p-chlorobenzene-sulphonate, phosphate, acetate, formate, propionate, oxalate, lactate, maleinate, crotonate, tartrate, citrate, $NO_3^-$, perchlorate and $ZnCl_3^-$.

Among the anions, the halides, such as chloride, bromide and iodide, hydrogen sulphate, phosphate and methosulphate, are of particular importance, as they are immediately obtained in the preparation of the dyestuffs according to the invention. The dyestuffs so obtained can converted into dyestuffs containing other anions by known exchange reactions. The type of anion is of no importance for the application of the dyestuffs, provided they are substantially colourless radicals which do not impair the solubility of the dyestuffs in an undesirable manner.

The dyestuffs according to the invention of formula (I) can be prepared by quaternising dyestuffs of the formula

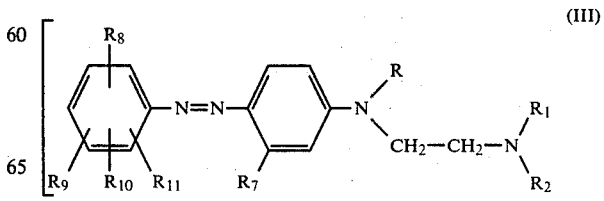

in known manner with compounds of the formula

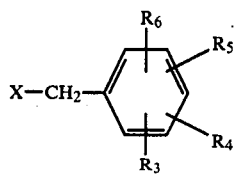
(IV)

in which X denotes a radical which can be split off as anion, and in which the other radicals have the same meaning as above.

Another process for the preparation of the new dyestuffs consists in that dyestuffs of the formula

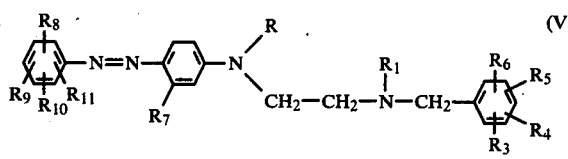
(V)

are quaternised in known manner with lower alkyl halides or lower alkyl sulphates of the formula $R_2X$ (VI)

or that dyestuffs of the formula

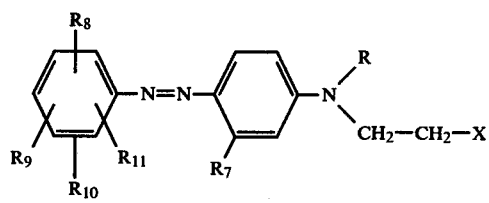
(VII)

are reacted with amines of the formula

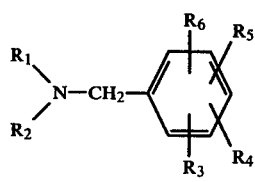
(VIII)

in which the radicals have the same meaning as above.

A further variant of the process consists in that amines of the formula

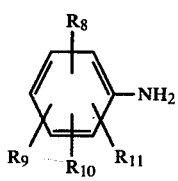
(IX)

are diazotised in known manner and the diazo compound is coupled with amines of the formula

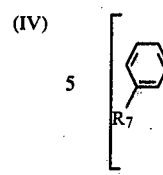
(X)

in which the radicals have the same meaning as above.

Ammonium compounds of the formula (X) can be prepared by quaternising amines of the formula

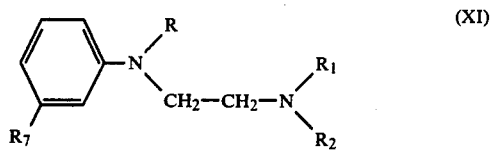
(XI)

in known manner with compounds of the formula (IV) or by quaternising amines of the formula

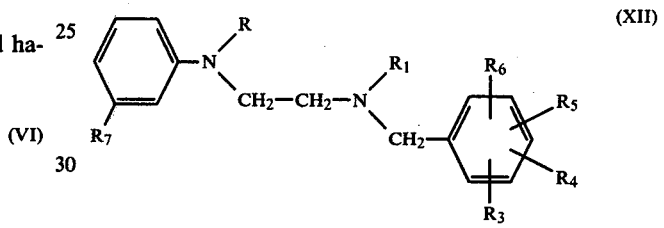
(XII)

in known manner with compounds of the formula (VI) or by reacting amines of the formula

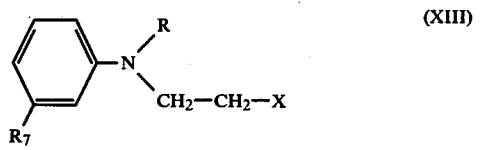
(XIII)

with amines of the formula (VIII).

The following aminobenzenes are primarily suitable as diazo components: 1-amino-4-chlorobenzene, 1-amino-4-bromo-benzene, 1-amino-4-methylbenzene, 1-amino-4-nitrobenzene, 1-amino-4-cyanobenzene, 1-amino-2,5-dicyanobenzene, 1-amino-4-carbalkoxybenzene, 1-amino-2,4-dichlorobenzene, 1-amino-2,4-dibromobenzene, 1-amino-2-methyl-4-chlorobenzene, 1-amino-2-cyano-4-chlorobenzene, 1-amino-2-cyano-4-nitrobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-chloro-4-carbethoxybenzene, 1-amino-2,4-dinitrobenzene, 1- amino-2,4-dicyanobenzene, 1-amino-2,6-dichloro-4-cyanobenzene, 1-amino-2,6-dichloro-4-nitrobenzene, 1-amino-2,4-dicyano-6-chlorobenzene, 1-amino-2,4-dinitro-6-chlorobenzene,1-amino-3-chloro-4-cyanobenzene, 1-amino-2-cyano-5-chlorobenzene, 1-amino-3,4-dicyanobenzene, 1-amino-2-cyano,4,5,6-trichlorobenzene, 1-amino-2-methoxy-4-nitrobenzene, 1-amino-2-cyano-4-nitro-6-chlorobenzene, 1-amino-2,4-dinitro-6-cyanobenzene, 1-amino-2,6-dicyano-4-nitrobenzene, 1-amino-2,4-dicyano-4-chlorobenzene, 1-amino-2,6-dicyano-4-carbomethoxybenzene, 1-amino-2,6-dicyano-4-methylbenzene, 1-amino-2- methyl-4-nitrobenzene, 1-amino-2-bromo-4-nitrobenzene, 1-amino-2-cyano-4,6-dinitrobenzene, 4-aminoazobenzene, 4-amino-4-nitroazobenzene, 1-amino-2-sulphomethyl-4-nitrobenzene, 1-amino-3,6-dichloro-4-cyanobenzene, 1-amino-2-cyanobenzene, 1-amino-4-carbomethylbenzene, 4-amino-diphenyl, 4-aminodiphenyl ether, 1-amino-4-acetyl-aminobenzene, 1-cyclohexyl-4-aminobenzene, 1-cyclohexyl-3-nitro-4-aminobenzene, 4-aminobenzophenone, 1-amino-4-N,N-dimethyl-sulphamoyl-benzene, 1-amino-2-nitro-4-N,N-dimethyl-sulphamoyl-benzene, 1-amino-3,6-dichloro-4-nitrobenzene.

Suitable starting amines of the formula (XIII) are for example:

| R | CH$_2$—CH$_2$X | R$_7$ |
| --- | --- | --- |
| ethyl | β-chloroethyl | hydrogen |
| n-propyl | β-chloroethyl | hydrogen |
| ethyl | β-chloroethyl | methyl |
| methyl | β-chloroethyl | methyl |
| 2-methyl-propyl | β-chloroethyl | hydrogen |
| ethyl | β-chloroethyl | methyl |
| ethyl | β-bromoethyl | methyl |
| ethyl | β-chloroethyl | ethoxy |
| n-propyl | β-chloroethyl | methyl |
| n-propyl | β-chloroethyl | methyl |
| iso-propyl | β-chloroethyl | methyl |
| methyl | β-chloroethyl | methyl |
| n-butyl | β-chloroethyl | methyl |
| n-propyl | 1-methyl-2-chloroethyl-1- | hydrogen |
| hydrogen | β-chloroethyl | hydrogen |
| hydrogen | β-chloroethyl | methyl |
| hydrogen | β-chloroethyl | methyl |
| hydrogen | β-bromoethyl | methyl |
| hydrogen | β-chloroethyl | methyl |
| hydrogen | β-chloroethyl | methyl |

Suitable starting amines of the formula (X) are, for example: β-[N-ethyl-N-phenyl]-aminoethyl-dimethyl-benzyl-ammonium-chloride, γ-[N-(β-chloroethyl)-N-m-tolyl]-aminopropyl-diethyl-benzyl-ammonium-chloride, β-[N-methyl-N-(2,5-dimethoxyphenyl)]-aminoethyl-dimethyl-benzyl-ammonium-chloride, β-[N-propyl-N-phenyl]-aminoethyl-di-n-propyl-(4-nitrobenzyl)-ammonium-chloride, β-[N-butyl-N-m-tolyl]-aminoethyl-dimethyl-(2,4-dichlorobenzyl)-ammonium-chloride, β-[N-ethyl-N-phenyl]-aminoethyl-dimethyl-(3-nitrobenzyl)-ammonium-chloride, β-[N-(β-ethoxyethyl)-N-phenyl]-aminoethyl-dimethyl-4-methylbenzyl-ammonium-chloride, β-[N-(β-cyanoethyl)-N-phenyl]-aminoethyl-dimethyl-benzyl-ammonium-chloride, β-[N-ethyl-N-phenyl]-aminoethyl-dimethyl-2,4,6-trichlorobenzyl-ammonium-chloride, β-[N-ethyl-N-m-tolyl]-aminoethyl-dimethyl-benzylammonium-chloride, β-[N-ethyl-N-phenyl]-aminoethyl-dimethyl-2,4,6-trimethylbenzyl-ammonium-chloride, β-[N-methyl-N-m-tolyl]-aminoethyl-dimethyl-benzylammonium-chloride, β-[N-ethyl-N-phenyl]-aminoethyl-dimethyl-4-bromobenzyl-ammonium-chloride, β-[N-ethyl-N-phenyl]-aminoethyl-benzyl-ammonium-chloride, β-[N-ethyl-N-phenyl]-aminoethyl-methyl-benzyl-ammonium-chloride, γ-[N-n-butyl-N-phenyl]-amino-propyl-dimethyl-benzyl-ammonium-chloride, γ-[N-methyl-N-phenyl]amino-propyl-(di-β-chloroethyl)-benzyl-ammonium-chloride, β-[N-methyl-N-m-tolyl]-aminoethyl-methyl-n-butyl-4-nitro-benzyl-ammonium-chloride, β-[N-methyl-N-m-tolyl]-aminoethyl-methyl-(1-methyl-propyl-1)-4-nitro-benzyl-ammonium-chloride, β-[N-2-methyl-propyl-N-phenyl]-aminoethyl-methyl-β-hydroxyethyl-benzyl-ammonium-chloride, β-[N-ethyl-N-phenyl]-aminoethyl-methyl-β-cyanoethyl-benzyl-ammonium-chloride, β-[N-ethyl-N-phenyl]-aminoethyl-β-cyanoethyl- 4-chloro-benzyl-ammonium-chloride, γ-[N-methyl-N-phenyl]-amino-propyl-[4-tert.butyl-benzyl]-ammonium-chloride, β-[N-ethyl-N-phenyl]-aminoethyl-dimethyl-(4-benzyl-benzyl)-ammonium-chloride, β-[N-ethyl-N-phenyl]-dimethyl-(4-methyl-diphenyl)-ammonium-chloride, β-[N-m-tolyl]-aminoethyl-dimethyl-(4-methyl-diphenyl)-ammonium-chloride, β-[β-ethoxy-ethyl-N-phenyl]-amino-ethyl-methyl-β-carbomethoxy-ethyl-4-nitrobenzyl-ammonium-chloride, δ-[N-methyl-N-m-tolyl]-amino-butyl-dimethyl-methyl-ammonium-chloride, β-[N-n-butyl-N-phenyl]-amino-ethyl-methyl-allyl-(2,4-dimethyl)-benzyl-ammonium-chloride, γ-[N-propyl-N-phenyl]-amino-propyl-bis-allyl-(4-chloro-benzyl)-ammonium-chloride, δ-[N-methyl-N-m-tolyl]-amino-butyl-allyl-(2,4-dichlorobenzyl)-ammonium-chloride, δ-[N-methyl-N-m-tolyl]-aminobutyl-(2,4,6-trichlorobenzyl)-ammonium-chloride, β-[N-methyl-(2,5-dimethoxy-phenyl)]-aminoethyl-dimethyl-(4-ethyl-benzyl)-ammonium-chloride, β-[β-chloroethyl-N-phenyl]-aminoethyl-methyl-β-chloroethyl-(4-ethoxy-benzyl)-ammonium-chloride, β-[N-methyl-N-2,5-diethoxy-phenyl]-aminoethyl-dimethyl-(4-n-propoxy-benzyl)-ammonium-chloride, β-[N-ethyl-N-phenyl]-amminoethyl-dimethyl-[tetrahydronaphthyl-(5)-methyl]-ammonium-chloride, β-[N-ethyl-N-phenyl]-aminoethyl-dimethyl-[4-chloro-naphthyl-(1)-methyl]-ammonium-chloride, β-[N-ethyl-N-phenyl]-aminoethyl-methyl-carbomethoxymethyl-(4-fluoro-benzyl)-ammonium-chloride, β-[N-ethyl-N-phenyl]-aminoethyl-dimethyl-(4-cyano-benzyl)-ammonium-chloride, β-[N-β-cyano-ethyl-N-m-tolyl]-amino-ethyl-dimethyl-[tetrahydronaphthyl-(5)-methyl]-ammonium-chloride, β-[N-ethyl-N-phenyl]-aminoethyl-dimethyl-4-isopropyl-benzyl-ammonium-chloride, β-[N-ethyl-N-m-acetylamino-phenyl]-amino-ethyl-dimethyl-[naphthyl-(1)-methyl]-ammonium-chloride, β-[N-ethyl-N-phenyl]-aminoethyl-dimethyl-[4-(4'-methyl-phenoxy)-benzyl]-ammonium-chloride, β-[N-ethyl-N-phenyl]-aminoethyl-dimethyl-(3-carbomethoxy-benzyl)-ammonium-chloride, β-[N-n-butyl-N-m-tolyl]-aminoethyl-dimethyl-(4-nitrobenzyl)-ammonium-chloride, β-[N-3-methyl-butyl-N-phenyl]-aminoethyl-dimethyl-benzyl-ammonium-chloride, β-[N-ethyl-N-m-tolyl]-aminoethyl-dimethyl-(4-ethoxy-benzyl)-ammonium-chloride, β-[N-ethyl-N-phenyl]-aminoethyl-methyl-methyl-carbonyloxy-ethylbenzyl-ammonium-chloride, β-[N-methyl-N-m-tolyl]-aminoethyl-methyl-(2-methyl-carbonyloxy-n-propyl)-benzyl-ammonium-chloride, β-[N-buten-(3)-yl-1-N-phenyl]-aminoethyl-dimethyl-benzyl-ammonium-chloride, β-[N-buten-(2)-yl-1-N-phenyl-]-aminoethyl-dimethyl-benzyl-ammonium-chloride, β-[N-phenyl]-aminoethyl-dimethyl-benzyl-ammonium-chloride, γ-[N-m-tolyl]-aminopropyl-diethyl-benzyl-ammonium-chloride, β-[N-(2,5-dimethoxy-phenyl)]-aminoethyl-dimethyl-benzyl-ammonium-chloride, β-[-phenyl]-aminoethyl-di-n-propyl-(4-nitrobenzyl)-ammonium-chloride, β-[N-m-tolyl]-aminoethyl-dimethyl-(2,4-dichlorobenzyl)-ammonium-chloride, β-[N-phenyl]-aminoethyl-dimethyl-(3-nitrobenzyl)-ammonium-chloride, β-[N-phenyl]-aminoethyl-dimethyl-4-methyl-benzyl-ammonium-chloride, β-[N-phenyl]-aminoethyl-dimethyl-2,4,6-trichlorobenzyl-ammonium-chloride, β-[N-m-tolyl]-aminoethyl-dimethyl-benzyl-ammonium-chloride, β-[N-phenyl]-aminoethyl-dimethyl-2,4,6-trimethyl-benzyl-ammonium-chloride, β-N- phenyl]-aminoethyl-dimethyl-4-bromo-benzyl-ammonium-chloride, β-[N-phenyl]-aminoethyl-benzyl-ammonium-chloride, β-[N-phenyl]-aminoethyl-methyl-benzyl-ammonium-chloride, γ-[N-phenyl]-amino-propyl-dimethyl-benzyl-ammonium-chloride, γ-[N-phenyl]-amino-propyl-(di-β-chloroethyl)-benzyl-ammonium-chloride, β-[N-m-tolyl]-aminoethyl-methyl-n-butyl-4-nitrobenzyl-ammonium-chloride, β-[N-m-tolyl]-aminoethyl-methyl-(1-methyl-propyl-1)-4-nitrobenzyl-ammonium-chloride, β-[N-phenyl] aminoethyl-methyl-β-hydroxyethyl-benzyl-ammonium-chloride, β-[N-phenyl]-aminoethyl-β-cyanethyl-4-chlorobenzyl-ammonium-chloride, γ-[N-phenyl]-aminopropyl-[4-tert.butyl-benzyl]-ammonium-chloride, β-[N-phenyl]-aminoethyl-dimethyl-(4-benzyl-benzyl)-ammonium-chloride, β-[N-phenyl]-dimethyl-(4-methyl-diphenyl)-ammonium-chloride, β-[N-m-tolyl]-aminoethyl-dimethyl-(4-methyl-diphenyl)-ammonium-chloride, β-[ethyl-N-phenyl]-aminoethyl-methyl-β-carbomethoxy-ethyl-4-nitrobenzyl-ammonium-chloride, δ-[N-m-tolyl]-aminobutyl-dimethyl-methyl-ammonium-chloride, δ-[N-m-tolyl]-aminobutyl-(2,4,6-trichlorobenzyl)-ammonium-chloride, β-[N-2,5-dimethoxy-phenyl]-aminoethyl-dimethyl-(4-ethyl-benzyl)-ammonium-chloride, β-[N-phenyl]-aminoethyl-methyl-β-chloroethyl-(4-ethoxy-benzyl)-ammonium-chloride, β-[N-2,5-diethoxy-phenyl]-aminoethyl-dimethyl-(4-n-propoxy-benzyl)-ammonium-chloride and the corresponding bromides, iodides and sulphato compounds.

Suitable compounds of the formula (XI) are, for example: N-ethyl-N-β-dimethylaminoethyl-aniline, N-ethyl-N-γ-dimethyl-aminoethyl-aniline, N-n-butyl-N-γ-dimethylamino-n-propyl-aniline, N-ethyl-N-β-dimethylamino-ethyl-m-toluidine, N-methyl-N-β-(methyl-n-butyl-)-aminoethyl-m-toluidine, N-ethyl-N-β-dimethyl-aminoethyl-2,5-dimethoxy-aniline, N-ethyl-N-β-di-n-propyl-aminoethyl-aniline, N-β-methoxyethyl-N-β-dimethyl-aminoethyl-m-toluidine, N-ethyl-N-β-aminoethyl-aniline, N-ethyl-N-β-methyl-aminoethyl-aniline, N-n-butyl-N-γ-dimethylamino-propyl-aniline, N-methyl-N- γ-(di-β-) chloroethyl-amino-propyl-aniline, N-methyl-N-β-methyl-n-butyl-aminoethyl-m-toluidine, N-2-methyl-propyl-1-N-β-methyl-(β'-hydroxyethyl)-aminoethyl-aniline, N-ethyl-N-β-methyl-(β'-cyanoethyl)-aminoethyl-aniline, N-ethyl-N-(β'-cyanoethyl)-aminoethyl-aniline, N-methyl-N-γ-aminopropyl-aniline, N-β-ethoxy-ethyl-N-β-methyl-(β'-carbomethoxyethyl)-aminoethyl-aniline, N-methyl-N-δ-dimethylamino-butyl-m-toluidine, N-n-butyl-N-β-methyl-allyl-aminoethyl-aniline, N-n-propyl-N-γ-bis-allyl-aminopropyl-aniline, N-methyl-N-δ-allyl-amino-butyl-m-toluidine, N-methyl-N-δ-aminobutyl-m-toluidine, N-β-hydroxyethyl-N-β-methyl-(β'-chloroethyl)-aminoethyl-aniline, N-methyl-N-dimethyl-aminoethyl-2,5-diethoxy-aniline, N-ethyl-N-β-di-n-propyl-aminoethyl-aniline, N-ethyl-N-β-methyl-carbomethoxy-methyl-amino-ethyl-aniline, N-ethyl-N-β-dimethyl-aminoethyl-m-N-3-methyl-butyl-N-dimethyl-aminoethyl-aniline, N-ethyl-N-β-methyl-(methyl-carbonyloxy-ethyl)-aminoethyl-aniline, N-methyl-N-β-methyl-(2-methyl-carbonyloxy-n-propyl)-aminoethyl-m-toluidine, N-buten-3-yl-1-N-β-dimethyl-aminoethyl-aniline and N-buten-2-yl-1-β-dimethylaminoethyl-aniline, N-β-dimethyl-aminoethyl-aniline, N-γ-dimethyl-amino-n-propyl-aniline, N-β-dimethyl-aminoethyl-m-toluidine, N-β-(methyl-n-butyl)-aminoethyl-m-toluidine, N-β-dimethyl-aminoethyl-2,5-dimethoxy-aniline, N-β-di-n-propyl-aminoethyl-aniline, N-β-aminoethyl-aniline, N-β-methyl-aminoethyl-aniline, N-γ-di-chloroethyl-aminopropyl-anilin, N-β-methyl-n-butyl-aminoethyl-m-toluidine, 1-N-β-methyl-(β'-hydroxyethyl)-aminoethyl-aniline, N-β-methyl-(β'-cyanoethyl)-aminoethyl-aniline, N-(β'-cyanoethyl)-aminoethyl-aniline, N-γ-amino-propyl-aniline, N-β-methyl-(β'-carbomethoxy-ethyl)-aminoethyl-aniline, N-δ-dimethyl-amino-butyl-m-toluidin, N-δ-amino-butyl-m-toluidin, N-β-methyl-(β'-chloroethyl)-aminoethyl-aniline, N-β-dimethyl-aminoethyl-2,5-diethoxy-aniline, N-β-Di-n-propyl-aminoethyl-aniline, N-β-methyl-carbomethoxy-methyl-aminoethyl-aniline, N-β-dimethyl-aminoethyl-m-acetyl-amino-aniline, N-β-dimethyl-aminoethyl-3-methyl-6-methoxy-aniline and the corresponding acyl derivates.

Suitable amines of the formula (XII) are, for example: N-ethyl-N-β-methyl-benzyl-aminoethyl-aniline, N-β-methoxy-ethyl-N-β-methyl-benzyl-aminoethyl-aniline, N-β-chloroethyl-N-β-methyl-benzyl-aminoethyl-aniline, N-ethyl-N-β-methyl-[diphenyl-(4)-methyl-]-aminoethyl-aniline, N-ethyl-N-β-methyl-[4'-methyl-diphenylmethane-(4)-methyl]-aminoethyl-aniline, N-methyl-N-β-n-butyl-benzyl-aminoethyl-m-toluidine, N-ethyl-N-β-methyl-(4-methoxy-benzyl)-aminoethyl-aniline, N-ethyl-N-β-n-propyl-benzyl-aminoethyl-aniline, N-ethyl-N-β-methyl-(4-tert.-butyl-benzyl)-aminoethyl-aniline, N-ethyl-N-β-methyl-[naphthyl-(1)-methyl]-aminoethyl-aniline, N-ethyl-N-β-methyl-2,4-dichlorobenzyl-aminoethyl-m-toluidine, N-ethyl-N-β-methyl-2,4-dimethylbenzyl-aminoethyl-aniline, N-methyl-N-γ-(β'-chlorobutyl)-benzyl-aminopropyl-aniline, N-methyl-N-β-n-butyl-4-nitrobenzyl-aminoethyl-m-toluidine, N-2-methyl-n-propyl-N-β-(β'-hydroxyethyl)-benzyl-aminoethyl-aniline, N-ethyl-N-(β-cyanoethyl)-benzyl-aminoethyl-aniline, N-methyl-N-γ-(4-tert.butyl)-benzyl-aminopropyl-aniline, N-ethyl-N-β-(β'-cyanoethyl-4-chlorobenzyl)-aminoethyl-aniline, N-n-propyl-N-γ-allyl-4-chlorobenzyl-aminopropyl-aniline, N-n-butyl-β-allyl-2,4-dimethyl-benzyl-amino-ethyl-aniline, N-methyl-N-δallyl-2,4-dichlorobenzyl-aminobutyl-m-toluidine, N-methyl-N-δ2,4,6-trichlorobenzyl-aminobutyl-m-toluidine, N-β-hydroxy-ethyl-N-β-methyl-4-ethoxy-benzylamino-ethyl-aniline, N-methyl-N-β-methyl-4-n-propoxy-benzyl-2,5-diethoxy-aniline, N-ethyl-N-β-methyl-[tetrahydronaphthyl-(5)-methyl]-aminoethyl-aniline, N-ethyl-N-β-methyl-[(4-chloronaphthyl-(5)-methyl]-aminoethyl-aniline, N-ethyl-N-β-carbomethoxy-methyl-4-fluorobenzyl-amino-ethyl-aniline, N-ethyl-N-β-methyl-3-cyano-benzyl-aminoethyl-aniline, N-β-cyano-ethyl-N-β-methyl-[tetrahydronaphthyl-(5)-methyl]-aminoethyl-m-toluidine, N-ethyl-N-β-methyl-[naphthyl-(1)-methyl]-aminoethyl-m-acetyl-amino-aniline, N-ethyl-N-β-methyl-[4-(4'-methyl-phenoxy)-benzyl]-aminoethyl-aniline, N-ethyl-N-β-methyl-3-carbomethoxybenzyl-aminoethyl-aniline, N-ethyl-N-β-methyl-[4-benzyloxy)-benzyl]-aminoethyl-(3-methyl-6-methoxy-aniline), N-ethyl-N-β-methyl-4-trifluoromethyl-benzyl-aminoethyl-m-toluidine, N-ethyl-N-β-methyl-(3-benzoyl-benzyl)-aminoethyl-aniline, N-β-hydroxyethyl-N-β-methyl-3-acetyl-benzyl-aminoethyl-aniline and N-allyl-N-β-methyl-4-methyl-benzyl-amino-ethyl-aniline, N-β-methyl-benzyl-aminoethyl-aniline, N-β-methyl-[diphenyl-(4)-methyl]-aminoethyl-aniline, N-β-methyl-[4'-methyl-diphenylmethane-( 4)-methyl]-aminoethyl-aniline, N-β-n-butyl-benzyl-aminoethyl-m-toluidine, N-β-methyl-(4-methoxy-benzyl)-aminoethyl-aniline, N-β-n-propyl-benzyl-aminoethyl-aniline, N-β-methyl-(4-tert.butyl-benzyl)-aminoethyl-aniline, N-β-methyl-[naphthyl-(1)- methyl]-aminoethyl-aniline, N-β-methyl-2,4-dichlorobenzyl-aminoethyl-m-toluidine, N-β-methyl-2,4-dimethyl-benzyl-aminoethyl-aniline, N-γ-(β'-chlorobutyl)-benzyl-aminopropyl-aniline, N-β-n-butyl-4-nitrobenzyl-aminoethyl-m-toluidine, N-β-(β'-hydroxyethyl)-benzyl-aminoethyl-aniline, N-β-(β'-cyanoethyl)-benzyl-amino-ethyl-aniline, N-γ-(4-tert.butyl)-benzyl-aminopropyl-anilin, N-β-(β'-cyanoethyl-4-chlorobenzyl)-aminoethyl-aniline, N-δ-2,4,6-trichlorobenzyl-aminobutyl-m-toluidine, N-β-methyl-4-ethoxybenzyl-aminoethyl-aniline, N-β-methyl-4-n-propoxybenzyl-2,5-diethoxy-aniline, N-β-methyl-[tetrahydronaphthyl-(5)-methyl]-aminoethyl-aniline, N-β-methyl-[(4-chloronaphthyl-(5)-methyl]-aminoethyl-aniline, N-β-carbomethoxy-methyl-4-fluorobenzyl-aminoethyl-aniline, N-β-methyl-3-cyano-benzyl-aminoethyl-aniline, and N-β-methyl-4-methyl-benzyl-aminoethyl-aniline.

Suitable compounds of the formula (IV) are, for example: benzylchloride, 2-chloro-benzylchloride, 4-methyl-benzylchloride, 4-chlorobenzylchloride, 4-benzyl-benzylchloride, diphenyl-chloromethane, 4-nitrobenzylchloride, 4-methoxy-benzylchloride, 4-bromobenzylchloride, 4-tert.benzylchloride, 2,4-dichlorobenzyl-chloride, 2,4-dimethyl-benzylchloride, 4-ethoxybenzylchloride, 4-n-propoxy-benzylchloride, 2,4,6-trichloro-benzylchloride, and the corresponding bromides.

Suitable compounds of the formula (VI) are, for example: methylchloride, methylbromide, methyliodide, dimethylsulphate, ethylsulphate, ethylchloride, ethyliodide, ethylbromide, methyl-p-toluene-sulphonate, ethyl-p-toluene-sulphonate, and also (proton-yielding) BRÖNSTEDT acids, such as, in particular, hydrochloric acid, sulphuric acid, methylsulphonic acid, phosphoric acid, formic acid, acetic acid and propionic acid.

Suitable amines of the formula (VIII) are primarily: N,N-dimethyl-benzylamine, N,N-diethyl-benzylamine, N-methyl-N-ethyl-benzylamine, N-ethyl-benzylamine, benzylamine, 2,4-dimethyl-benzylamine, N,N-dimethyl-2,4-dimethyl-benzyl-amine and N,N-dimethyl-4-nitrobenzylamine.

The products according to the invention are valuable dyestuffs which are suitable for the dyeing and printing of materials consisting of leather, tanned cotton, synthetic superpolyamides and -urethanes, cellulose acetate and for the dyeing of lignin-containing fibres such as coconut, jute and sisal. The are also suited for the production of writing liquids, stamp dyes, pastes for ball point pens, and they can be used in offset printing.

The dyestuffs according to the invention are particularly suitable for the dyeing of fibres and formed articles such as flocks, threads, ribbons, fabrics or knitted fabrics of polyacrylonitrile, copolymers of acrylonitrile with other vinyl compounds, such as vinyl chloride, vinylidene chloride, vinyl fluoride, vinyl acetate, vinylpyridine, vinyl-imidazole, vinyl alcohol, acrylic and methacrylic acid esters and amides and as. dicyanoethylene; or flocks, fibres, threads, ribbons, fabrics or knitted fabrics of acid-modified aromatic polyesters and acid-modified polyamides. Acid-modified aromatic polyesters are, for example, polycondensation products of sulphoterephthalic acid and ethylene glycol, i.e. polyethylene glycol terephthalates containing sulphonic acid groups (type DACRON 64 of E.I.DuPont de Nemours and Company), such as are described in Belgian Patent Specification No. 549,179 and U.S. Pat. No. 2,893,816.

Dyeing can be carried out from a weakly acidic bath; it is expedient to introduce the material into the dyebath at 40°–60° C. and then to dye at boiling temperature. It is also possible to dye under pressure at temperatures above 100° C. Furthermore, the dyestuffs can be added to spinning solutions for the production of fibres containing polyacrylonitrile, or they can be applied to the non-stretched fibre.

Compared with the dyestuffs described in Dutch Patent Specification No. 112,048, which are largely analogous except for the quaternary group, the dyestuffs according to the invention, especially the benzyl-quaternary dyestuffs, surprisingly, are characterised by a substantially higher water-solubility and usually also a substantially higher drawing speed which is normally twice to three times higher, in spite of their substantially larger organic radical on the quaternary nitrogen atom. Another advantage consists in that the dyestuffs according to the invention can be easily combined with other dyestuffs. The water-solubility of some of the dyestuffs according to the invention is extremely high. In some cases it is even possible to obtain an appr. 50% by weight aqueous solution (Example 1). In these particularly advantageous cases it is possible to apply the dyestuff as liquid dyestuff without the expensive organic solvent which is commonly used.

Further advantages of the new dyestuffs are the fastness to light and washing, the insensitivity for different pH-values and the high colour strength. Moreover they are suitable for the dyeing of mixture of the above mentioned fibers with acid dyeable fibres such as acid dyeable polyamides, because they do not stain these fibres.

The degrees in the following Examples stand for degrees Centigrade.

EXAMPLE 1

15.2 Parts by weight 2-cyano-5-chloroaniline are dissolved in 46 parts by weight of concentrated sulphuric acid at 0°–5° and diazotised with good cooling and stirring with 17 parts by weight nitrosyl-sulphuric acid (42 g nitrite in 100 cc); after about 2 hours, the mixture is poured on to about 300 g of ice, a small excess of nitrite is removed with the aid of amidosulphonic acid, and the solution is filtered. This solution is then combined with a solution of 30.7 parts by weight of the base of the following formula

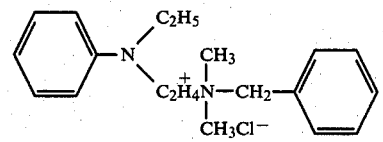

in water, the mixture is adjusted to about pH 5 with a sodium hydroxide solution and salted out with ammonium sulphate. An approximately 50% solution of the dyestuff separates in the form of a liquid. It dyes polyacrylonitrile fibres in yellowish orange shades.

The coupling base mentioned above is obtained by the following method:

500 g dimethylamino-ethylchloride-chlorohydrate are introduced with stirring into 1000 g monoethyl-aniline. The mixture is heated to 115° C. and this temperature is maintained for 24 hours. The reaction product is subsequently poured with stirring into a mixture of 640 g of a 44% sodium hydroxide solution (280 g at 100%) and 700 g of ice. The temperature should not rise above 50° C. 100 cc of water are boiled in the reaction vessel and likewise poured into the sodium hydroxide solution. (The whole material must be clearly sodium-alkaline). After cooling to about 20° C., the oily product is separated and fractionally distilled in a vacuum, 576 g ethyl-β-dimethyl-aminoethyl-aniline (b.p. 138°-142° C./15 mm Hg) being obtained.

The following starting amines of the formula (XI) are obtained in an analogous way:

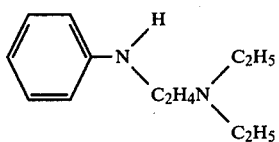

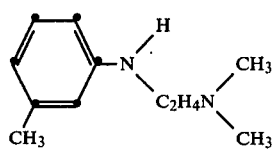

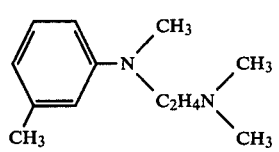

1920 g N-ethyl-N-β-dimethyl-aminoethyl-aniline are heated with 1920 cc of water to 95° C.; 1280 g benzyl chloride are then added within about 1 hour while stirring at the same temperature, and stirring is continued for 1 hour. A clear aqueous solution is formed which can immediately be used for working up into dyestuffs. 100 g of piece material of polyacrylonitrile are treated with the following dyebath:

0.6 g of the dyestuff

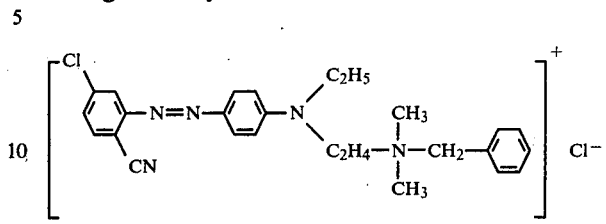

are pasted with hot water and dissolved in 500 ml of hot water. 0.5 g of the reaction product of 50 g ethylene oxide with 1 mol oleyl alcohol as well as 12.5 g sodium sulphate are added to the dyebath.

The dyebath is then adjusted with acetic acid to pH 4.5 and 1 g sodium acetate is added. The fabric is dyed at 100° C. and a yellowish orange shade is obtained; the dyestuff has completely drawn on the fibre already after 15 minutes.

EXAMPLE 2

14.3 Parts by weight 2-chloro-4-nitroaniline are coupled as in Example 1 with the same base.

Upon neutralising to pH 5, the dyestuff is precipitated and it is filtered off with suction and dried. It is 2½ times as soluble in water as the corresponding dyestuff of Dutch Patent Specification No. 112,048, Example 1. It dyes polyacrylonitrile fibres in red shades.

The following dyestuffs are obtained in the same way:

| Diazo component | Coupling component | Shade on polyacrylonitrile |
|---|---|---|
| $O_2N-\text{C}_6H_3(Cl)-NH_2$ | (phenyl)-N(C₂H₅)(CH₃)-C₂H₄N⁺(CH₃)-CH₂-(2-Cl-C₆H₄) Cl⁻ | red |
| " | (phenyl)-N(C₂H₅)(CH₃)-C₂H₄N⁺(CH₃)-CH₂-(4-CH₃-C₆H₄) Cl⁻ | red |
| " | (phenyl)-N(C₂H₅)(CH₃)-C₂H₄N⁺(CH₃)-CH₂-(biphenyl) Cl⁻ | red |
| " | (phenyl)-N(C₂H₅)(C₂H₅)-C₂H₄N⁺(C₂H₅)-CH₂-(phenyl) Cl⁻ | red |
| " | (phenyl)-N(C₂H₅)-C₂H₄N(CH₃)⁺-CH₂-(phenyl)-CH₂-(phenyl) Cl⁻ | red |
| " | (phenyl)-NH-C₂H₄-N⁺(CH₃)(CH₃)-CH₂-(phenyl) Cl⁻ | red |

-continued
| Diazo component | Coupling component | Shade on polyacrylonitrile |
|---|---|---|
| " | 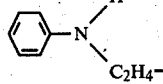 | red |
| " | 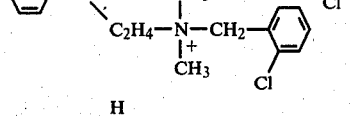 | red |
| " | 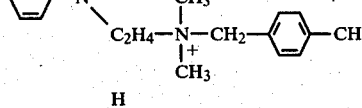 | red |
| " | 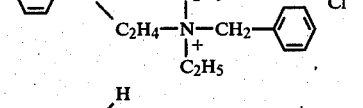 | red |
| " | 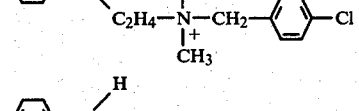 | red |
| " | 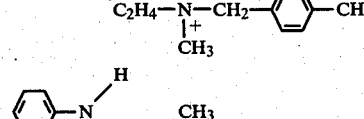 | red |
| " | 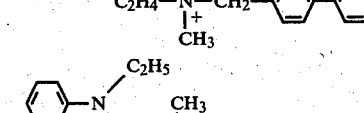 | red |
| 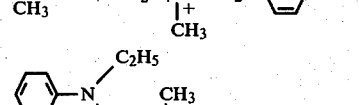 | 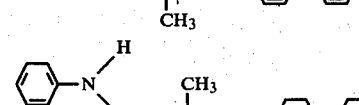 | orange |
| " | 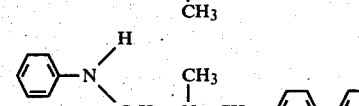 | orange |
| 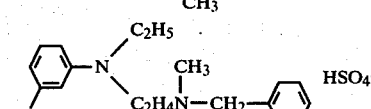 | 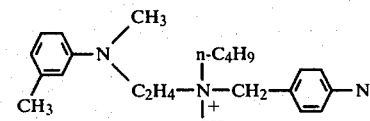 | orange |
|  | | Bordeaux |
| " | | Bordeaux |

-continued

| Diazo component | Coupling component | Shade on polyacrylonitrile |
|---|---|---|
| " | [N-ethyl-N-phenyl, C2H4-N+(CH3)2-CH2-phenyl] Cl⁻ | bluish red |
| " | [N-H-phenyl, C2H4-N+(CH3)2-CH2-phenyl] Cl⁻ | bluish red |
| 2,6-dichloro-4-nitroaniline | [N-ethyl-N-phenyl, C2H4-N+(CH3)2-CH2-phenyl] Cl⁻ | yellow-brown |
| " | [N-ethyl-N-(3-methylphenyl), C2H4-N+(CH3)2-CH2-phenyl] Cl⁻ | red-brown |
| " | [N-H-phenyl, C2H4-N+(CH3)2-CH2-phenyl] Cl⁻ | yellow-brown |
| " | [N-H-(3-methylphenyl), C2H4-N+(CH3)2-CH2-phenyl] Cl⁻ | red-brown |
| 4-amino-1,3-dicyanobenzene | [N-ethyl-N-phenyl, C2H4-N+(CH3)2-CH2-C6H4-OCH3] Cl⁻ | red |
| " | [N-ethyl-N-(3-methylphenyl), C2H4-N+(CH3)2-CH2-phenyl] Cl⁻ | red |
| " | [N-H-phenyl, C2H4-N+(CH3)2-CH2-C6H4-OCH3] Cl⁻ | red |
| " | [N-H-(3-methylphenyl), C2H4-N+(CH3)2-CH2-phenyl] Cl⁻ | red |
| 5-amino-1,2-dicyanobenzene | [N-ethyl-N-(3-methylphenyl), C2H4-N+(CH3)2-CH2-phenyl] Cl⁻ | orange |
| 2-chloro-5-cyano-4-aminochlorobenzene | [N-ethyl-N-(3-methylphenyl), C2H4-N+(CH3)2-CH2-phenyl] Cl⁻ | orange |

| Diazo component | Coupling component | Shade on polyacrylonitrile |
|---|---|---|
| " | 3-CH₃-C₆H₄-N(H)-C₂H₄-N⁺(CH₃)₂-CH₂-C₆H₅ Cl⁻ | orange |
| 3-Cl, 2-NH₂, 5-O₂N, 1-CN benzene | 3-CH₃-C₆H₄-N(C₂H₄OCH₃)-C₂H₄-N⁺(CH₃)₂-CH₂-C₆H₅ Cl⁻ | violet |
| " | 3-CH₃-C₆H₄-N(H)-C₂H₄-N⁺(CH₃)₂-CH₂-C₆H₅ Cl⁻ | violet |
| 5-O₂N, 2-NH₂, 1-COOCH₃ benzene | C₆H₅-N(H)-C₂H₄-N⁺(CH₃)₂-CH₂-C₆H₄-C(CH₃)₃ Cl⁻ | red |
| " | C₆H₅-N(C₂H₅)-C₂H₄-N⁺(CH₃)₂-CH₂-C₆H₄-C(CH₃)₃ Cl⁻ | red |
| 4-NC, 2-Cl, 1-NH₂ benzene | " | orange |
| 4-NC, 3-CN, 1-NH₂ benzene | " | orange |
| 5-O₂N, 2-NH₂, 3-CN benzene | C₆H₅-N(H)-C₂H₄-N⁺(CH₃)₂-CH₂-C₆H₅ Cl⁻ | bluish red |
| " | C₆H₅-N(C₂H₅)-C₂H₄-N⁺(CH₃)₂-CH₂-C₆H₄-CH₃ HSO₄⁻ | red |
| " | C₆H₅-N(H)-C₂H₄-N⁺(CH₃)₂-CH₂-C₆H₄-CH₃ HSO₄⁻ | red |
| 4-O₂N, 2-NH₂, 1-Cl benzene | C₆H₅-N(C₂H₅)-C₂H₄-N⁺(CH₃)₂-CH₂-C₆H₃Cl₂ Cl⁻ | red |
| " | 3-CH₃-C₆H₄-N(C₂H₅)-C₂H₄-N⁺(CH₃)₂-CH₂-C₆H₃Cl₂ Cl⁻ | red |

-continued

| Diazo component | Coupling component | Shade on polyacrylonitrile |
|---|---|---|
| " | C₆H₅-NH-C₂H₄-N⁺(CH₃)₂-CH₂-(2,4-diCl-C₆H₃) Cl⁻ | red |
| " | (3-CH₃-C₆H₄)-NH-C₂H₄-N⁺(CH₃)₂-CH₂-(2,4-diCl-C₆H₃) Cl⁻ | red |
| 2,6-dichloro-4-nitroaniline | C₆H₅-NH-C₂H₄-N⁺(CH₃)₂-CH₂-(4-CH₃-C₆H₄) Cl⁻ | brown |
| " | C₆H₅-N(C₂H₅)-C₂H₃N⁺(CH₃)₂-CH₂-(4-CH₃-C₆H₄) Cl⁻ | brown |
| " | (3-CH₃-C₆H₄)-N(C₂H₅)-C₂H₄-N⁺(CH₃)₂-CH₂-(2,4-diCH₃-C₆H₃) Cl⁻ | brown |
| " | (3-CH₃-C₆H₄)-NH-C₂H₄-N⁺(CH₃)₂-CH₂-(2,4-diCH₃-C₆H₃) Cl⁻ | brown |
| 2-chloro-4-nitroaniline | C₆H₅-N(C₂H₅)-C₂H₄-N⁺H₂-CH₂-C₆H₅ Cl⁻ | red |
| " | C₆H₅-N(C₂H₅)-C₂H₄-N⁺(CH₃)(H)-CH₂-C₆H₅ Cl⁻ | red |
| " | C₆H₅-NH-C₂H₄-N⁺H₂-CH₂-C₆H₅ Cl⁻ | rot |
| " | C₆H₅-NH-C₂H₄-N⁺(CH₃)(H)-CH₂-C₆H₅ Cl⁻ | rot |
| " | (3-CH₃-C₆H₄)-N(CH₃)-C₂H₄-N⁺(CH₃)₂-CH₂-(4-biphenyl) Cl⁻ | red |
| " | (3-CH₃-C₆H₄)-NH-C₂H₄-N⁺(CH₃)₂-CH₂-(4-biphenyl) Cl⁻ | red |

-continued

| Diazo component | Coupling component | Shade on polyacrylonitrile |
|---|---|---|
| 2-amino-1,4-dicyanobenzene | N-methyl-N-(3-methylphenyl)-N'-benzyl-N',N'-dimethyl-N'-(4-biphenylyl)methyl ethylenediammonium chloride | orange |
| " | N-(3-methylphenyl)-N'-benzyl-N',N'-dimethyl-(4-biphenylyl)methyl ethylenediammonium chloride | orange |
| 2-amino-3-chloro-5-nitrobenzonitrile | N-methyl-N-phenyl-N'-benzyl-N',N'-dimethyl ethylenediammonium chloride | violet |
| " | N-methyl-N-phenyl-N'-(4-biphenylyl)methyl-N',N'-dimethyl ethylenediammonium chloride | violet |
| " | N-phenyl-N'-(4-biphenylyl)methyl-N',N'-dimethyl ethylenediammonium chloride | violet |
| " | N-(3-methylphenyl)-N'-(4-benzylbenzyl)-N',N'-dimethyl ethylenediammonium chloride | violet |
| 2-amino-5-acetoxy-1,3-dicyanobenzene | N-ethyl-N-phenyl-N'-(2,4-dichlorobenzyl)-N',N'-dimethyl ethylenediammonium chloride | red |
| " | N-phenyl-N'-(2,4-dichlorobenzyl)-N',N'-dimethyl ethylenediammonium chloride | red |
| " | N-ethyl-N-(3-methylphenyl)-N'-benzyl-N',N'-dimethyl ethylenediammonium chloride | red |
| " | N-(3-methylphenyl)-N'-benzyl-N',N'-dimethyl ethylenediammonium chloride | red |
| 2-amino-4-nitro-1-methylbenzene (2-amino-5-nitrotoluene) | N-ethyl-N-phenyl-N'-benzyl-N',N'-dimethyl ethylenediammonium chloride | red |
| " | N-ethyl-N-phenyl-N'-(4-isopropylbenzyl)-N',N'-dimethyl ethylenediammonium chloride | red |

-continued
| Diazo component | Coupling component | Shade on polyacrylonitrile |
|---|---|---|
| " | 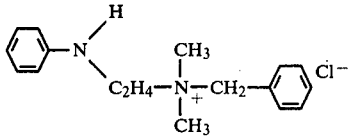 | red |
| " | 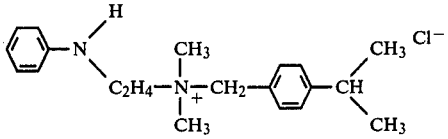 | red |
| " | 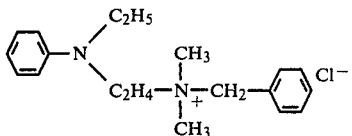 | red |
| " | 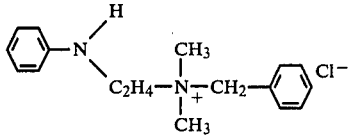 | red |
| 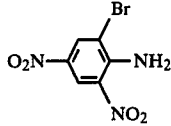 | 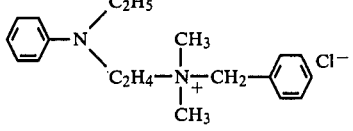 | violet |
| " | 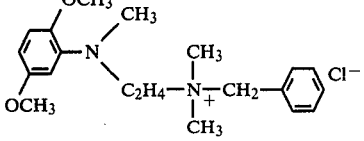 | violet |
| " | 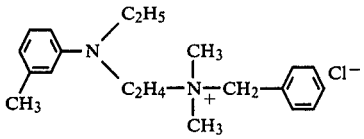 | violet |
| " | 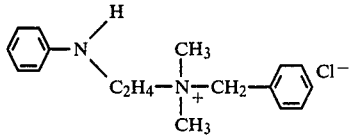 | violet |
| " | 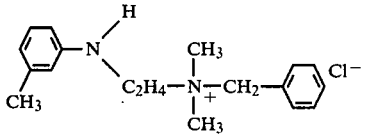 | violet |
| 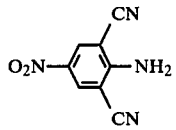 | 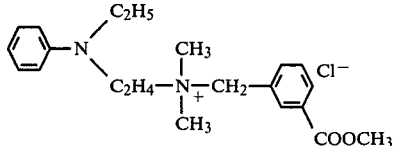 | violet |
| " | 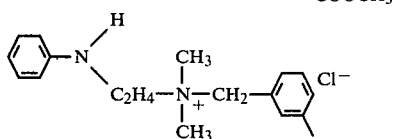 | violet |
| 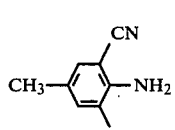 | 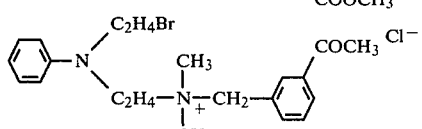 | red |

-continued
| Diazo component | Coupling component | Shade on polyacrylonitrile |
|---|---|---|
| " | 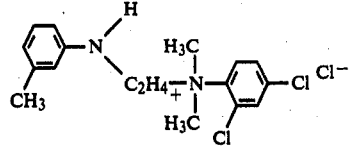 | red |
| 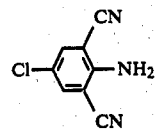 | 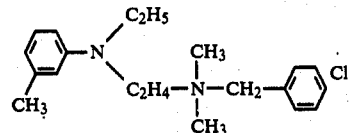 | red |
| " | 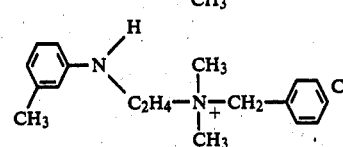 | red |
| 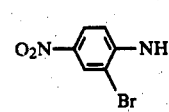 | 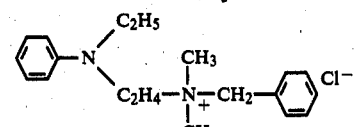 | red |
| " | 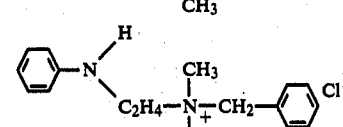 | red |
| 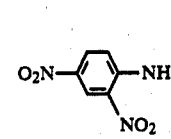 | 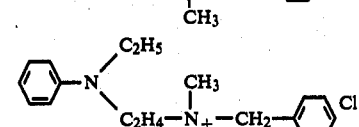 | Bordeaux |
| " | 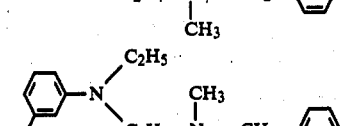 | Bordeaux |
| " | 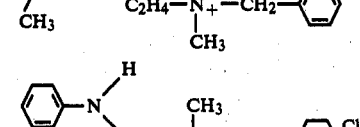 | Bordeaux |
| " | 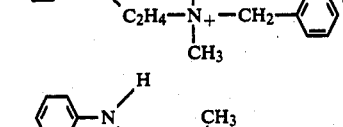 | Bordeaux |
| 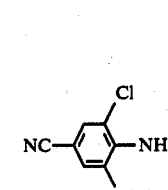 | 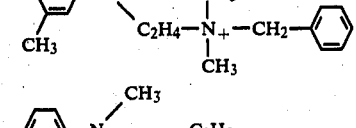 | orange |
| " | 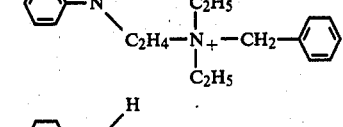 | orange |
| 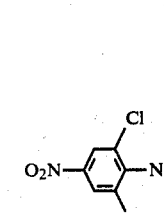 | 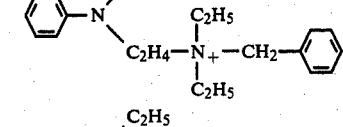 | violet |

-continued
| Diazo component | Coupling component | Shade on polyacrylonitrile |
|---|---|---|
| " | 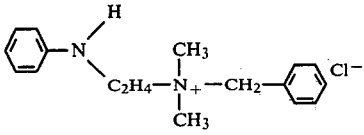 | violet |
| 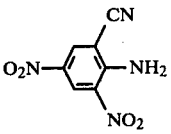 | 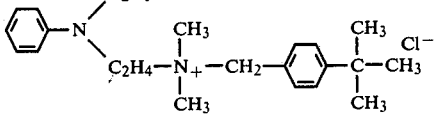 | violet |
| " | 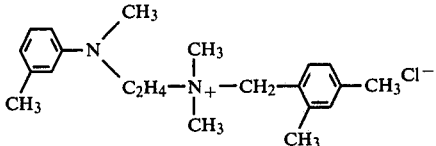 | violet |
| " | 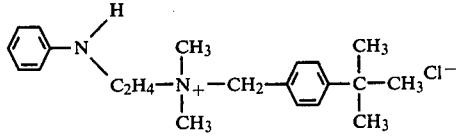 | violet |
| " | 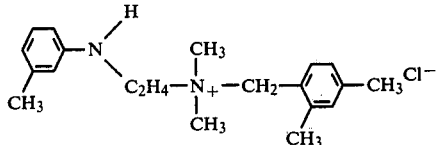 | violet |
| 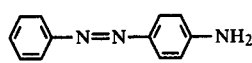 | 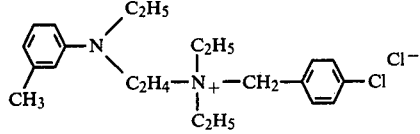 | orange |
| " | 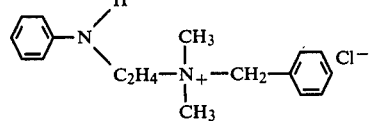 | orange |
| " | 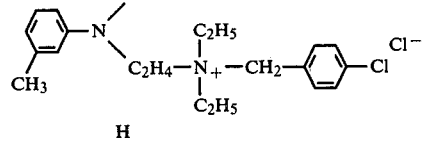 | orange |
| 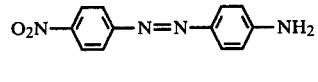 | 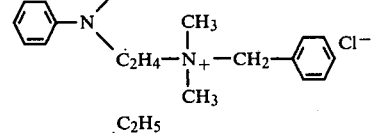 | orange |
| 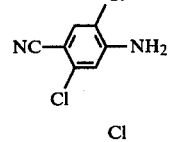 | 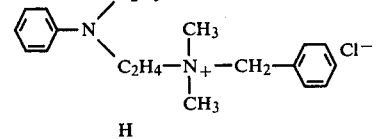 | orange |
| 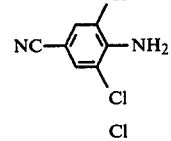 | 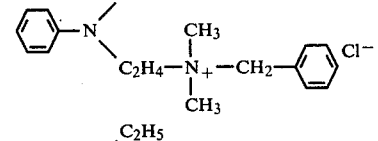 | orange |
| 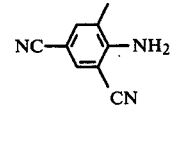 | 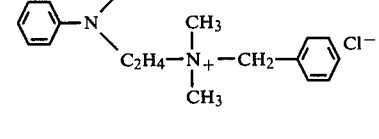 | bluish red |

-continued

| Diazo component | Coupling component | Shade on polyacrylonitrile |
|---|---|---|
| " | PhNH-C₂H₄-N⁺(CH₃)₂-CH₂-Ph  Cl⁻ | bluish red |
| NC-C₆H₄-NH₂ | Ph-N(C₂H₅)-C₂H₄-N⁺(CH₃)₂-CH₂-Ph  Cl⁻ | yellowish orange |
| " | PhNH-C₂H₄-N⁺(CH₃)₂-CH₂-Ph  Cl⁻ | yellowish orange |
| 2-CN-C₆H₄-NH₂ | PhNH-C₂H₄-N⁺(C₂H₅)₂-CH₂-Ph  Cl⁻ | orange |
| " | (3-CH₃-C₆H₄)NH-C₂H₄-N⁺(C₂H₅)₂-CH₂-Ph  Cl⁻ | orange |
| " | (3-CH₃-C₆H₄)N(C₂H₅)-C₂H₄-N⁺(C₂H₅)₂-CH₂-Ph  Cl⁻ | orange |
| " | (3-CH₃-C₆H₄)N(C₂H₅)-C₂H₄-N⁺(C₂H₅)₂-CH₂-C₆H₄-CH₂CH₂CH₃  Cl⁻ | yellow |
| " | PhNH-C₂H₄-N⁺(CH₃)₂-CH₂-Ph  Cl⁻ | yellow |
| " | (3-CH₃-C₆H₄)NH-C₂H₄-N⁺(C₂H₅)₂-CH₂-C₆H₄-CH₂CH₂CH₃  Cl⁻ | yellow |
| CH₃CO-C₆H₄-NH₂ | (3-CH₃-C₆H₄)NH-C₂H₄-N⁺(CH₃)₂-CH₂-C₆H₄-NO₂  Cl⁻ | orange |
| 2,4-Cl₂-C₆H₃-NH₂ | (3-CH₃-C₆H₄)N(C₂H₅)-C₂H₄-N⁺(CH₃)₂-CH₂-C₆H₄-O-CH(CH₃)₂  Cl⁻ | yellow |
| " | Ph-N(C₂H₅)-C₂H₄-N⁺(CH₃)₂-CH₂-Ph  Cl⁻ | yellow |

-continued
| Diazo component | Coupling component | Shade on polyacrylonitrile |
|---|---|---|
| " | 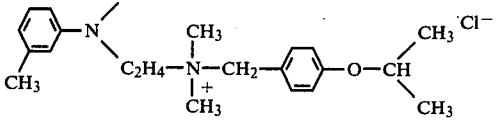 | yellow |
| " | 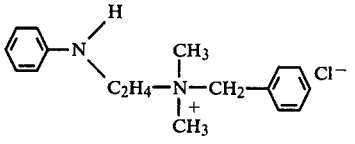 | yellow |
| Br—⌬—NH₂ | 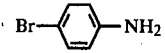 | yellow |
| " | 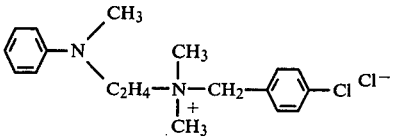 | yellow |
| " | 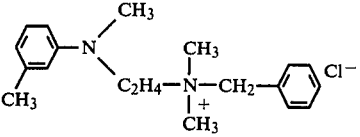 | yellow |
| " | 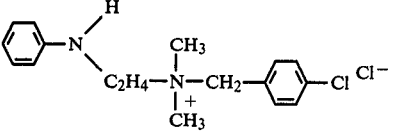 | yellow |
| NC—⌬(Cl,Cl)—NH₂ | 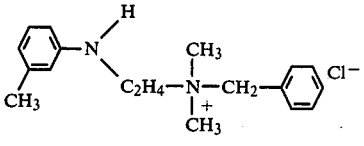 | orange |
| " | 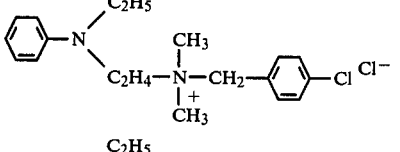 | orange |
| " | 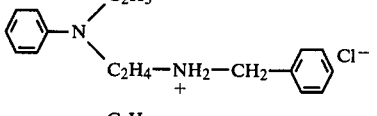 | orange |
| " | 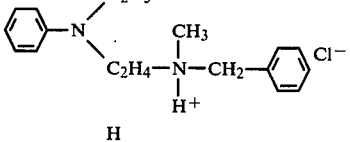 | orange |
| " | 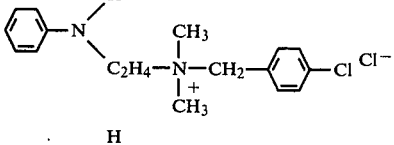 | orange |
| " | 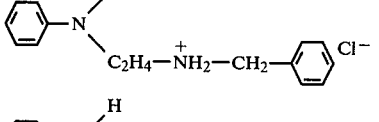 | orange |

| Diazo component | Coupling component | Shade on polyacrylonitrile |
|---|---|---|
| NC–C₆H₂(Cl)(CN)–NH₂ | PhN(C₂H₅)(C₂H₄–N⁺(CH₃)₂–CH₂–C₆H₃Cl₂) Cl⁻ | bluish red |
| " | (3-CH₃)C₆H₄–N(C₂H₅)(C₂H₄–N⁺(CH₃)₂–CH₂Ph) | bluish red |
| " | PhNH(C₂H₄–N⁺(CH₃)₂–CH₂–C₆H₃Cl₂) Cl⁻ | bluish red |
| " | (3-CH₃)C₆H₄–NH(C₂H₄–N⁺(CH₃)₂–CH₂Ph) Cl⁻ | bluish red |
| (CH₃)₂NSO₂–C₆H₄–NH₂ | PhN(C₂H₅)(C₂H₄–N⁺(CH₃)₂–CH₂Ph) Cl⁻ | yellow |
| " | PhNH(C₂H₄–N⁺(C₂H₅)₂–CH₂Ph) Cl⁻ | yellow |
| (CH₃)₂NSO₂–C₆H₃(NO₂)–NH₂ | PhN(CH₃)(C₂H₄–N⁺(CH₃)₂–CH₂–C₆H₄–C(CH₃)₃) Cl⁻ | red |
| " | PhNH(C₂H₄–N⁺(CH₃)₂–CH₂–C₆H₄–CH₃) Cl⁻ | red |
| " | PhNH(C₂H₄–N⁺(CH₃)₂–CH₂–C₆H₄–C(CH₃)₃) Cl⁻ | red |

Diazotisation and coupling of the above components in a sulphuric acid or phosphoric acid medium yields, besides the chloride-containing dyestuffs obtained above, dyestuffs containing hydrogen sulphate or dihydrogen phosphate as anions; these mixtures do not change the specified shades of the chlorine-containing dyestuffs.

EXAMPLE 3

345.5 g of the dyestuff of the formula

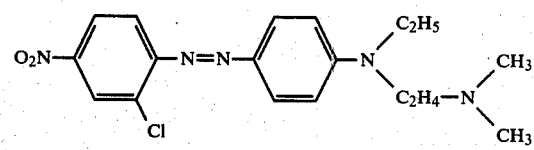

(prepared by diazotisation of 1-amino-2-chloro-4-nitrobenzene and coupling with β-N-ethyl-N-phenyl-aminoethyl-dimethylamine) are heated with 192 cc of water to 95° C.; 128 g benzyl chloride are then added within about 1 hour while stirring at the same temperature, and stirring is continued for 1 hour. The resultant dyestuff of the formula

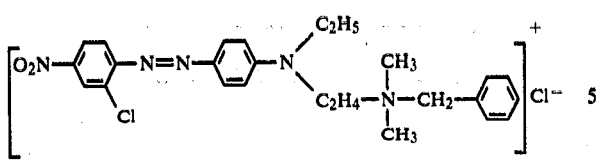

is separated by salting out. It dyes polyacrylonitrile in red shades.

The dyestuff of the formula

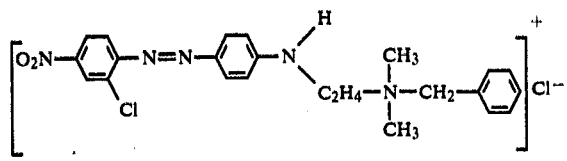

is obtained in the same way.

EXAMPLE 4

130 g dimethyl sulphate are added dropwise at room temperature, while stirring, to 268 g N-ethyl-N-β-methylbenzyl-aminoethyl-aniline and 300 cc of water, until a clear solution has formed. The latter is directly worked up into dyestuffs as described in Examples 1 and 2.

EXAMPLE 5

423.5 g of the dyestuff

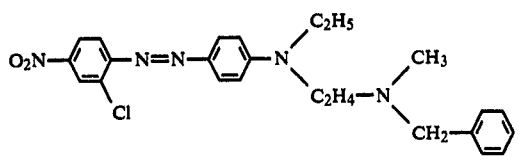

(prepared by diazotisation of 1-amino-2-chloro-4-nitrobenzene and coupling with β-N-ethyl-N-phenyl-aminoethyl-methylbenzylamine) are suspended in 300 cc of water, and 130 g dimethyl sulphate are added at room temperature while stirring. The resultant dyestuff of the formula

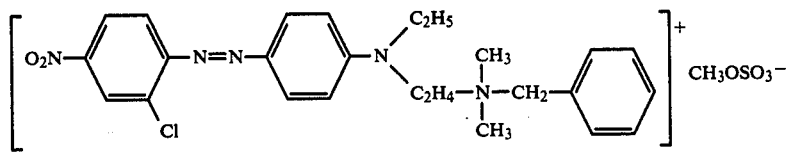

is separated by salting out. It dyes polyacrylonitrile in red shades.

The dyestuff of the formula

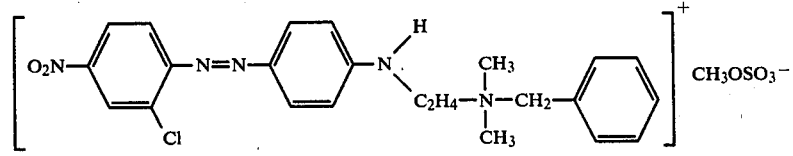

is obtained in the same way.

EXAMPLE 6

22.8 g N-ethyl-N-β-bromoethyl-aniline and 13.5 g N,N-dimethyl-benzylamine are heated to 140°–160° C.

while stirring, until a sample clearly dissolves in water. The base so obtained is immediately worked up into dyestuffs as described in Examples 1 and 2.

EXAMPLE 7

274 g of the dyestuff of the formula

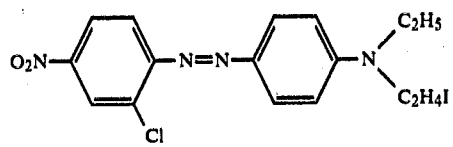

(prepared by diazotisation of 1-amino-2-chloro-4-nitrobenzene and coupling with β-N-ethyl-N-phenyl-iodoethylamine) are suspended in 300 cc of water, and 135 g N,N-dimethyl-benzylamine are added at room temperature while stirring.

The resultant dyestuff of the formula

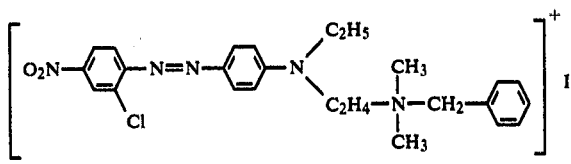

is separated by salting out. It dyes polyacrylonitrile in red shades.

The dyestuff of the formula

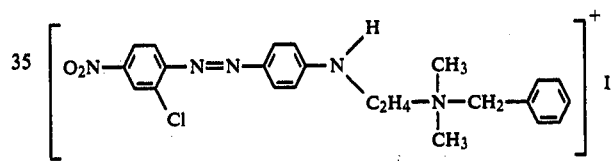

is obtained in the same way.

EXAMPLE 8

In a dyeing beaker of 500 ml capacity which is placed on a heatable water bath, 0.07 g of the dyestuff of the formula

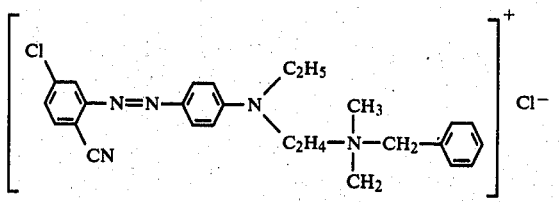

are pasted with the 20-fold amount of hot water with the addition of some acetic acid, and dissolved in hot water. 0.5 g of the reaction product of 50 mol ethylene oxide with 1 mol oleyl alcohol as well as 1.5 g of a conventional aromatic o-hydroxy-carboxylic acid methyl ether are added to the dyebath.

The dyebath is made up to 500 ml with cold water. The pH value of the dyebath is then adjusted to 4.5–5 with the aid of acetic acid or sodium acetate.

10 g of piece material consisting of acid-modified polyesters are then continuously moved about in this dyebath while the temperature is increased to 100° C. within 15 minutes. The dyestuff has completely drawn already after 15 minutes' boiling time. The material is then rinsed with cold water and subsequently dried, e.g. by ironing or in a drying cabinet at 60°–70° C. A yellowish orange shade is finally obtained.

The same shade on acid-modified polyesters is obtained, when 0.07 g of the dyestuff of the formula

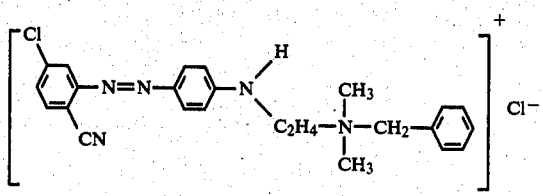

are used in the same way.

EXAMPLE 9

In a dyeing beaker of 500 ml capacity which is placed on a heatable water-bath, 0.055 g of the dyestuff of the formula

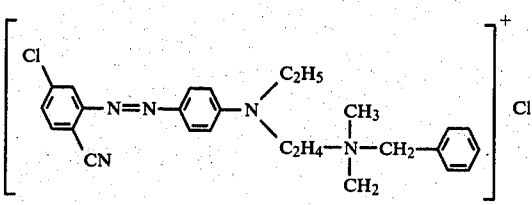

are pasted with the 20-fold amount of hot water with the addition of some acetic acid, and dissolved in hot water. 0.5 g of the reaction product of 50 mol ethylene oxide with 1 mol oleyl alcohol are added to the dyebath which is made up to 500 ml with cold water. The pH value of the dyebath is adjusted to 4.5–5 with the aid of acetic acid or sodium acetate.

10 g of piece material consisting of acid-modified polyamide are continuously moved about in this dyebath while the temperature is raised to 100° C. within 15 minutes. The dyestuff has completely drawn already after 15 minutes' boiling time. The material is then rinsed with cold water and subsequently dried, e.g. by ironing or in a drying cabinet at 60°–70° C.

The same shade on acid-modified polyamides is obtained, when 0.055 g of the dyestuff of the formula

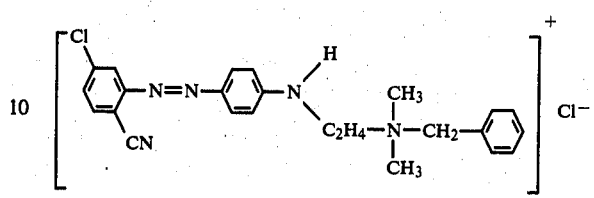

are used in the same way.

EXAMPLE 10

East Indian bastard leather which has been prepared for dyeing in the usual way is dyed at 40° C. for 45 minutes in the drum in a liquor ratio of 1:10 with 1% of the dyestuff of the formula

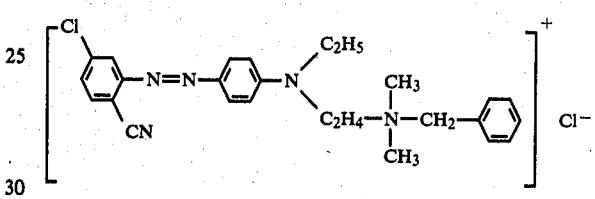

which has previously been pasted with the same amount of 30% acetic acid. The leather is finished in known manner yellowish-orange dyeing of good fastness properties is obtained. The same dyeing on East Indian bastard leather is obtained, when the dyestuff of the formula

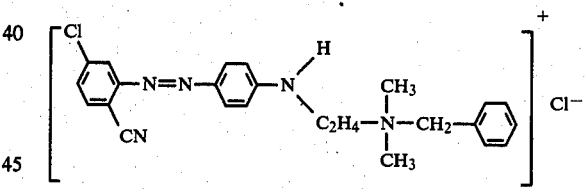

is used in the same way.

I claim:

1. Azo dyestuffs which are free of sulfonic acid groups and carboxylic acid groups and correspond to the formula

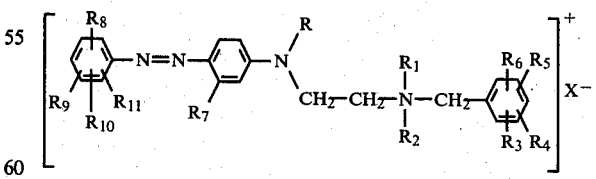

in which

R stands for hydrogen, methyl, ethyl, n-propyl, iso-propyl or n-butyl;

$R_1$ is hydrogen, methyl or ethyl;

$R_2$ is methyl or ethyl;

$R_3$ is hydrogen, chlorine, bromine, nitro, methyl, ethyl, n-propyl, iso-propyl, n-butyl, tert.-butyl, methoxy, ethoxy, n-propoxy, iso-propoxy, n-butoxy, benzyl or phenyl;

$R_4$ is hydrogen, chlorine, bromine, nitro, methyl, ethyl, n-propyl, iso-propyl, n-butyl, tert.-butyl, methoxy, ethoxy, n-propoxy, iso-propoxy, n-butoxy, benzyl or phenyl;

$R_5$ is hydrogen, chlorine, bromine, nitro, methyl, ethyl, n-propyl, iso-propyl, n-butyl, tert.-butyl, methoxy, ethoxy, n-propoxy, iso-propoxy, n-butoxy benzyl or phenyl;

$R_6$ is hydrogen, chlorine, bromine, nitro, methyl, ethyl, n-propyl, iso-propyl, n-butyl, tert.-butyl, methoxy, ethoxy, n-propoxy, iso-propoxy, n-butoxy, benzyl or phenyl;

$R_7$ is hydrogen or methyl;

$R_8$ is hydrogen, chlorine, bromine, cyano, nitro, carbomethoxy, methoxy, methyl or N,N-dimethylsulphamoyl;

$R_9$ is hydrogen, chlorine, bromine, cyano, nitro, carbomethoxy, methoxy, methyl or N,N-dimethylsulphamoyl;

$R_{10}$ is hydrogen, chlorine, bromine, cyano, nitro, carbomethoxy, methoxy, methyl or N,N-dimethylsulphamoyl;

$R_{11}$ is hydrogen, chlorine, bromine, cyano, nitro, carbomethoxy, methoxy, methyl or N,N-dimethylsulphamoyl; and $X^{31}$ is an anion.

2. Azo dyestuffs which are free of sulfonic acid groups and carboxylic acid groups and correspond to the formula

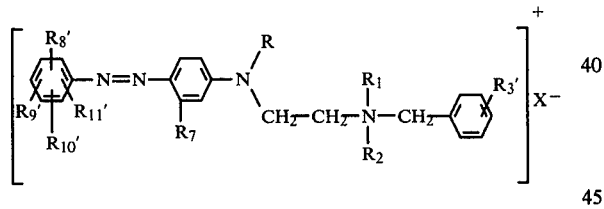

in which

R stands for hydrogen, methyl, ethyl, n-propyl, iso-propyl or n-butyl;

$R_1$ is hydrogen, methyl or ethyl;

$R_2$ is methyl or ethyl;

$R'_3$ is hydrogen, chlorine, nitro, methyl, ethyl, n-propyl; tert.-butyl, methoxy, ethoxy;

$R_7$ is hydrogen or methyl;

$R'_8$ is hydrogen, bromine, methyl, chlorine, cyano or nitro;

$R'_9$ is hydrogen, bromine, methyl, chlorine, cyano or nitro;

$R'_{10}$ is hydrogen, bromine, methyl, chlorine, cyano or nitro;

$R'_{11}$ is hydrogen, bromine, methyl, chlorine, cyano or nitro; and $X^-$ is an anion.

3. Azo dyestuffs of claim 2, wherein $R'_3$ is hydrogen and $R_1$ is methyl or ethyl.

4. The dyestuff of the formula

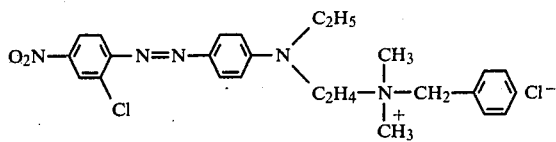

5. The dyestuff of the formula

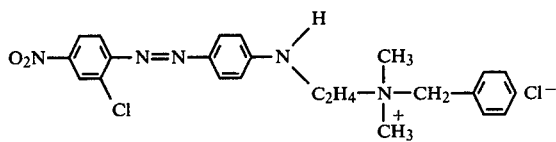

6. The dyestuff of the formula

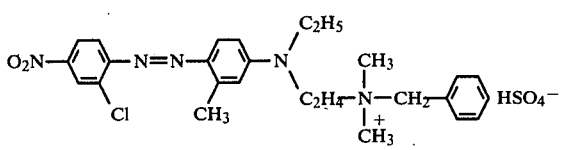

7. The dyestuff of the formula

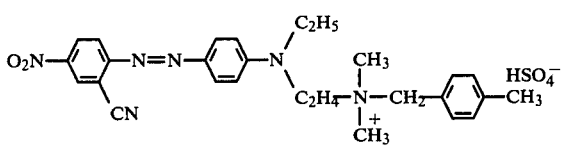

8. The dyestuff of the formula

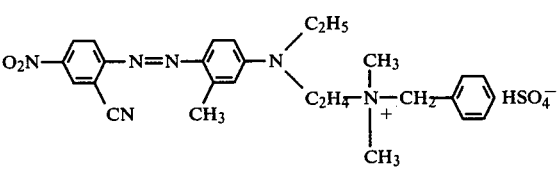

9. The dyestuff of the formula

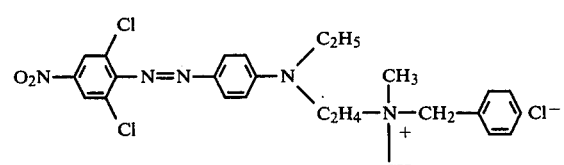

10. The dyestuff of the formula

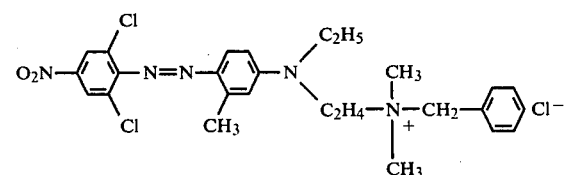

11. The dyestuff of the formula

12. The dyestuff of the formula
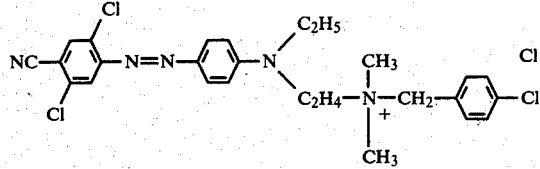
13. The dyestuff of the formula
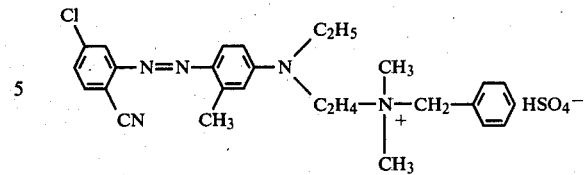
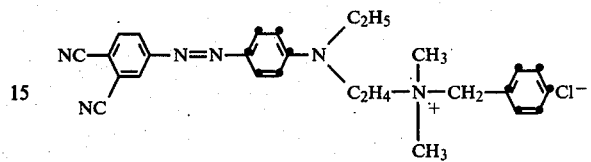
* * * * *